A. PERCIFULL.
AUTOMOBILE JACK.
APPLICATION FILED MAR. 21, 1919.
1,331,671.
Patented Feb. 24, 1920.
2 SHEETS—SHEET 2.
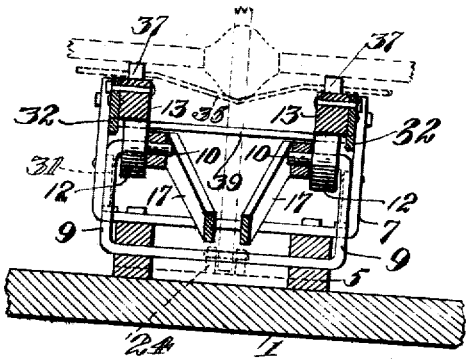
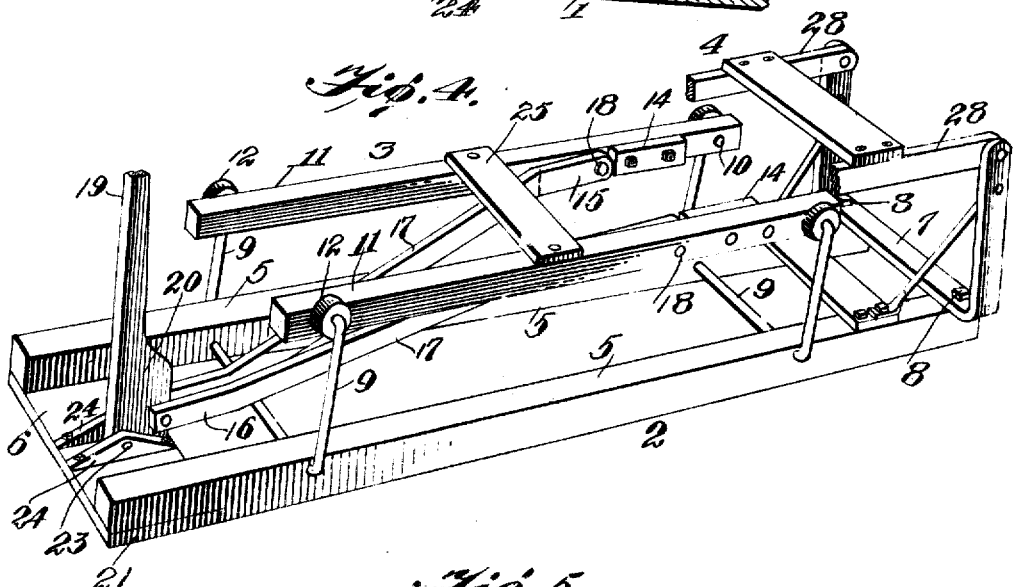
Inventor
A. Percifull.

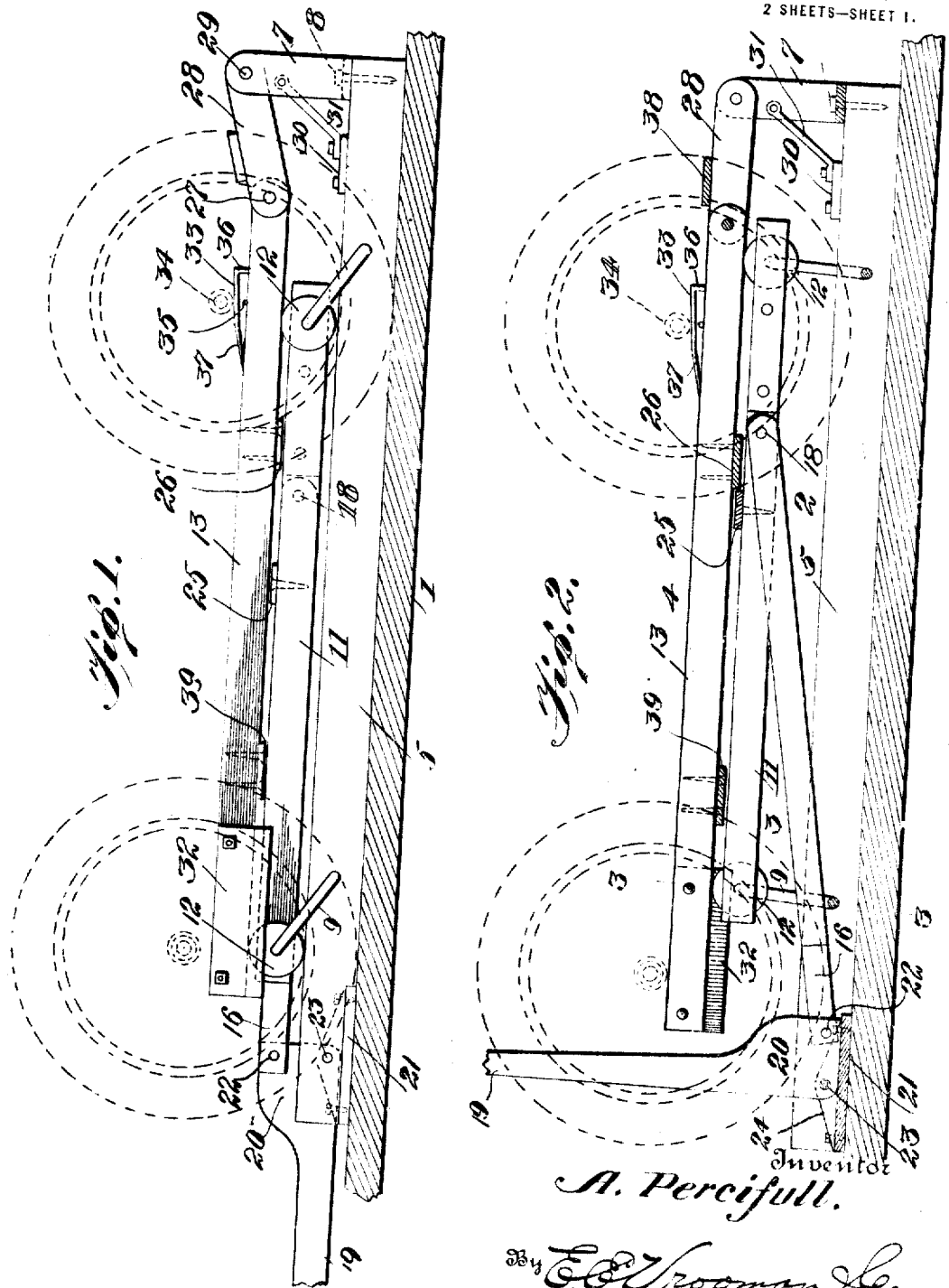

UNITED STATES PATENT OFFICE.

ALBERT PERCIFULL, OF MERCER, TENNESSEE.

AUTOMOBILE-JACK.

1,331,671.  Specification of Letters Patent.  Patented Feb. 24, 1920.

Application filed March 21, 1919. Serial No. 283,981.

*To all whom it may concern:*

Be it known that I, ALBERT PERCIFULL, a citizen of the United States, residing at Mercer, in the county of Madison and State of Tennessee, have invented certain new and useful Improvements in Automobile-Jacks, of which the following is a specification, reference being had therein to the accompanying drawings.

This invention relates to an automobile jack or an automobile lifter, and has for its object the construction of a comparatively simple and efficient jack or lifter that can be quickly operated for lifting an automobile or motor vehicle so that the tires will be caused to clear the floor of a garage or shed and thereby remove the weight of the vehicle off the tires, increasing the life of said tires.

With this and other objects in view, my invention comprises certain novel constructions, combinations, and arrangements of parts as will be hereinafter specifically described, illustrated in the accompanying drawings, and more particularly pointed out in the appended claim.

In the drawings,

Figure 1 is a view in side elevation of a mechanism constructed in accordance with the present invention, showing the mechanism in an inactive or unset position, while Fig. 2 is a similar view showing the mechanism in an active or "set" position for holding the tires off the floor or ground.

Fig. 3 is a sectional view taken on line 3—3, Fig. 2.

Fig. 4 is a perspective view of the base structure and the lifting device of the mechanism.

Fig. 5 is a plan view of one of the link beams.

Referring to the drawings by numerals, 1 designates the floor or ground of a shed or garage, and resting upon the floor is the base structure 2 of my mechanism; the lifting device (Fig. 4) of the mechanism works between the base or primary structure and the upper or auxiliary structure 4.

The base structure comprises parallel beams 5 which are secured together at one end by inset, transverse plate or board 6, and the opposite ends of the beams are held together by a stationary U-shaped bracket 7; bracket 7 being bolted to the beams 5 at 8.

The intermediate or lifting device comprises swinging or pivotally-mounted U-shaped brackets 9; the brackets 9 extending through the beams 5 and having their upper ends 10 (Fig. 3) projecting inwardly, upon which are mounted the parallel beams 11 of the lifting device. On the upper ends 10 of the brackets 9, and engaging the outer faces of the beams 11, are rollers 12. The rollers 12 are provided for receiving the beams 13 of the upper or auxiliary structure or automobile-engaging frame. Secured to the inner faces of the beams 11, near one end, are bearing blocks 14, and abutting against the inner ends of these blocks are the inner ends of the link beams; each link beam comprises an inner end 15, an outer end 16, and an intermediate, central portion 17. The ends 15 and 16 are parallel, whereas the central portion 17 is constructed at an angle to the ends 15 so that the inner ends 15 may be secured at 18 against the inner faces of the beams 11, and positioned between the outer ends 16 is lever 19. Lever 19 has a broad base 20 provided with a flat or straight lower end that engages snugly the upper face of the transverse plate 6 when the mechanism is in a set position. The ends 16 of the link beams are connected at 22 to the broad base 20 of the lever, and the lever is also connected at 23 to the parallel-supporting blocks 24 secured to the central portion of the transverse plate 6. A stop-piece or plate 25 is secured to the upper edges or faces of beams 11 and the inner edge of this stop-piece 25 engages the stop-piece 26 secured to the under face of the beams 13 of the auxiliary or automobile-engaging frame (Fig. 2).

The auxiliary or automobile-engaging frame comprises said parallel beams 13 which are pivotally connected at 27 to short link beams 28, which link beams 28 are pivotally connected at 29 to the upper ends of the U-shaped stationary bracket 7. A transverse plate or piece 30 is secured to the beams 5 near bracket 7, and an angularly-disposed brace 31 is secured at one end to the bracket 7 and at its other end to this plate or piece 30, for the purpose of efficiently bracing the bracket 7. As mentioned hereinbefore, the beams 13 are adapted to engage the rollers 12 and travel slightly thereon; to prevent displacement of the auxiliary frame off these rollers, I provide guiding plates or pieces 32 on the sides of the beams 13, at their outer ends, that project a considerable distance below the beams and overlap the sides of the rollers 12 carried by the outer swinging bracket 9 (Figs. 1, 2, and 3). These guiding pieces or plates 32 prevent any displacement of the auxiliary frame, insuring of positive action when the lever is swung to set the frame, or, in other words, lifting the automobile off the floor 1 as shown in dotted lines in Fig. 2.

The jack can be placed quickly under an automobile, or an automobile can be run over the jack from either end thereof, and then the lever swung to raise the automobile at the will of the operator.

If an automobile has a truss rod as a part of its running gear, then I prefer to place angle supports 33 under the axle 34 to support the weight at that end of the automobile without causing the weight to rest upon the rod 35. Each of the angle supports is laid upon the top of a beam 13, and comprises a substantially-horizontal central body integral at one end with the right-angled extension 36 and at the other end with a downwardly-inclined portion 37.

When the lever is swung to its set position, by reason of its broad, straight edge 21, it will be practically impossible to accidentally trip or swing the lever, thereby securely holding the entire mechanism in its set or raised position (Fig. 2).

The link beams 28 are braced by a transverse strip or plate 38, and the beams 13 are braced by a transverse strip or plate 39 in addition to the stop-plate or piece 26.

I wish it to be understood that I reserve the right to make certain minor alterations or changes to my mechanism as shall appear to one skilled in the art to which this invention relates, which minor changes or alterations shall fairly fall within the scope of the appended claim.

What I claim is:

In a mechanism of the class described, the combination of a base frame provided with an inset transverse piece at one end, a lever provided with a broad, straight base pivotally mounted upon said transverse piece, a U-shaped bracket secured upon the opposite end of said frame, an auxiliary frame, links pivotally connected at their inner ends to the inner end of said auxiliary frame and having their outer ends pivotally connected to the upper ends of the U-shaped bracket, a swinging and vertically-movable lifting device between said base frame and said auxiliary frame, and angle link beams having their inner ends pivotally connected to the lifting device, and their outer ends brought close together and pivotally connected to opposite sides of said lever.

In testimony whereof I hereunto affix my signature.

ALBERT PERCIFULL.